Nov. 28, 1944.   H. K. BERGHOLM   2,363,771
REFRIGERATION
Filed Feb. 24, 1944
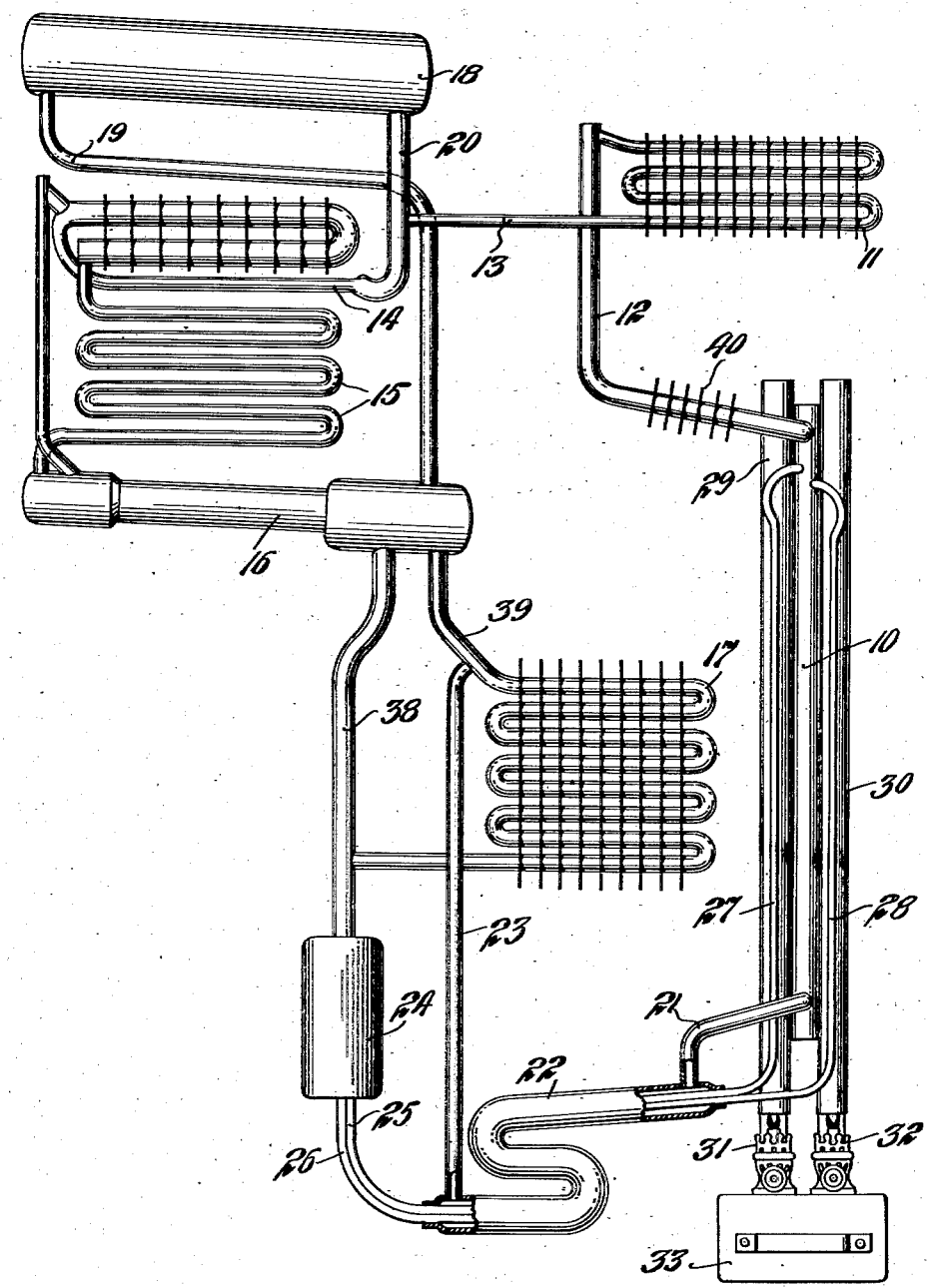
INVENTOR.
Harry K. Bergholm
BY
D. E. Heath
his ATTORNEY Patented Nov. 28, 1944

2,363,771

UNITED STATES PATENT OFFICE 2,363,771

REFRIGERATION

Harry Karl Bergholm, Stockholm, Sweden

Application February 24, 1944, Serial No. 523,641
In Sweden January 14, 1943

7 Claims. (Cl. 62—119.5)

My invention relates to refrigeration and more particularly to improvements in the method of and arrangement for supplying heat to the generator of a refrigerating apparatus.

In accordance with my invention I supply heat to the generator from two heat sources by intermedium of two flue tubes. Also in accordance with my invention I improve the rectification of the generator vapors by decreasing the temperature of the solution supplied to the upper part of the liquid column in the generator by means of two vapor lift conduits.

Further objects and advantages will be apparent from the following description taken in connection with the accompanying drawing in which is schematically shown a continuous absorption refrigerating apparatus of the type in which pressure is equalized by a circulating gas.

My invention relates generally to absorption refrigerating systems but is herein described in connection with a continuous absorption system in which the pressure is equalized by a circulating inert gas such as hydrogen. Obviously any suitable combination of fluids may be used in this system, but for the purposes of description ammonia may be the cooling fluid and water the absorbent.

Referring to the drawing a tubular generator 10 is connected to an aircooled condenser 11 by means of a conduit 12. Liquified refrigerant flows through conduits 13 and 14 into an evaporator 15 which may be arranged within a refrigerating storage compartment not shown in the figure. The evaporator 15 is interconnected with an aircooled absorber 17 by intermedium of a gas heat exchanger 16 and conduits 38 and 39. Ammonia vapor expelled from the solution by heating in the generator flows through an aircooled rectifier 40 and the conduit 12 to the condenser 11. Ammonia condensed to liquid in said condenser flows into the upper part of the evaporator and flows then downwardly, evaporating by diffusion into hydrogen gas which enters the evaporator through its lower connection to the gas heat exchanger 16.

The resulting gas mixture flows from the evaporator through the heat exchanger 16 and the conduit 38 into the lower entrance of the absorber 17. From the absorber the gas, after having become poor of refrigerant vapors, passes through the conduit 39 and the gas heat exchanger 16 to the lower part of the evaporator.

Enriched absorption liquid accumulates in an absorber vessel 24 and flows from there through two conduits 25 and 26 to each one vapor lift conduit 27 and 28 respectively, said two conduits forming the inner passage of a liquid heat exchanger 22, through the outer passage of which poor solution from the generator 10 by intermedium of a conduit 21 and a conduit 23 flows to the upper entrance of the absorber 17. According to my invention I prefer to conduct the liquid to each of the two vapor lift conduits 27 and 28 through two separate conduits from a common storage vessel, the liquid content of which is a relatively large one.

According to my invention I provide in heat conductive relation to the tubular body portion or vessel of the generator 10 two separate flue tubes 29 and 30 to which heated gases are supplied from each of two oil burners 31 and 32 respectively, said burners receiving oil from a common oil tank 33. I prefer to have each of the two vapor lift conduits 27 and 28 arranged in thermal connection with one of the flue tubes 29 and 30 respectively.

The two cooperating vapor lift conduits will be able to inject the necessary quantity of liquid into the generator at a lower temperature than the working temperature of one single pump, adapted to inject an equal quantity of liquid into the generator. Accordingly the concentration of refrigerant in the liquid injected by two cooperating pumps will be large in comparison with the concentration obtained by using one pump only. This is because the internal diameter of each of two pipes is less than the internal diameter of a single pipe for delivering the same amount of liquid and the slippage or loss in a vapor lift pump decreases at a greater ratio than the decrease in the internal diameter of the pipe. As a result the concentration of refrigerant in the upper part of the liquid column of the generator will be a relatively high one, and consequently the rectification of the vapors expelled in the generator will be improved.

However I prefer to dimension and arrange the refrigerating apparatus in such a way that under easy or low load conditions sufficient heat may be supplied to the generator by one of the heat sources only. Due to the fact that each of the two vapor lift conduits 27 and 28 are connected to the storage vessel 24 by intermedium of separate conduits 25 and 26 respectively, there will arise no disturbances between the two pumps one of which is operating, the other one being out of operation.

During certain circumstances one of the pumps may be omitted, the other pump being so dimensioned and arranged in such heat relative connection to one of the flue tubes 29 or 30 that the pumping effect is sufficient to obtain a satisfactory liquid circulation through the generator and the absorber. I then prefer to provide indicating and/or controlling means in order to insure lighting of that burner the flue of which has heat conductive connection with the vapor lift pump.

It will be obvious to those skilled in the art, that various other changes may be made in the connection and arrangement without departing from the spirit of the invention and therefore my invention is not limited to what is shown in the drawing and in the specification, but only as indicated in the following claims.

What I claim is:

1. A generator for an absorption refrigeration system comprising a single generator vessel, means for supplying liquid to the vessel, means for discharging liquid from the vessel, separate means for conducting vapor from the vessel, a plurality of flues arranged in heat conducting relationship with said vessel, and a separate source of heat for each flue whereby the heat is transmitted from the flues to the vessel to heat the liquid therein.

2. A generator for an absorption refrigeration system comprising a vessel, a plurality of flues arranged in heat conducting relationship with said vessel, a vapor lift conduit in heat conducting relationship with one of the flues and connected to supply liquid to the vessel adjacent its upper end, and a separate source of heat for each flue whereby the heat is transmitted from the flues to the vessel and to the vapor lift conduit to supply liquid to the vessel and heat the liquid therein.

3. A generator for an absorption refrigeration system comprising a vessel, a plurality of flues arranged in heat conducting relationship with said vessel, a vapor lift tube for each flue in heat conducting relationship therewith and connected to supply liquid to the vessel adjacent its upper end, and a separate source of heat for each flue whereby the heat is transmitted from the flues to the vessel and to the vapor lift tubes.

4. In an absorption refrigeration system comprising a plurality of interconnected elements to provide circuits for a refrigerant and absorption solution including a heat exchanger, a condenser and a generator, said generator having a vessel connected between the heat exchanger and condenser, a plurality of flue tubes welded to the sides of the vessel, and a separate source of heat for each flue tube.

5. In an absorption refrigeration system comprising a plurality of interconnected elements to provide circuits for a refrigerant and absorption solution including a storage vessel, a condenser and a generator, said generator having a tubular vessel connected to the condenser, a plurality of flue tubes arranged in heat conducting relationship with the sides of the vessel, a vapor lift tube for each flue tube in heat conducting relationship therewith and connected to the vessel adjacent its upper end, a conduit for each vapor lift tube connecting it to the storage vessel, and a separate source of heat for each flue tube.

6. In an absorption refrigeration system comprising a plurality of interconnected elements to provide circuits for a refrigerant and absorption solution comprising an absorber, a storage vessel connected to the absorber, a condenser and a generator, said generator having a tubular vessel connected to the condenser, a plurality of flue tubes arranged in heat conducting relationship with the sides of the vessel, a vapor lift tube for each flue tube in heat conducting relationship therewith and connected to the generator vessel adjacent its upper end, a conduit for each vapor lift tube connected to receive liquid from the storage vessel, a conduit connecting the generator and absorber in heat exchanging relationship with the conduits for the vapor lift tubes, and a separate source of heat for each flue tube.

7. In an absorption refrigeration system comprising a plurality of interconnected elements to provide circuits for a refrigerant and absorption solution comprising an absorber, a storage vessel connected to the absorber, a condenser and a generator, said generator having a tubular vessel connected to the condenser, a plurality of flue tubes arranged in heat conducting relationship with the sides of the tubular vessel, a vapor lift tube for each flue tube in heat conducting relationship therewith and connected to the tubular vessel adjacent its upper end a conduit for each vapor lift tube connected to receive liquid from the storage vessel, a conduit connecting the generator and absorber in heat exchanging relationship with the conduits for the vapor lift tubes, a separate oil burner for each flue tube, and a common oil tank arranged to supply oil to the separate oil burners.

HARRY KARL BERGHOLM.